US011926778B2

(12) United States Patent
Geng et al.

(10) Patent No.: US 11,926,778 B2
(45) Date of Patent: Mar. 12, 2024

(54) CHOLESTERIC LIQUID CRYSTAL BASED SOLID SHELL AND PRODUCTION METHOD THEREOF

(71) Applicant: Université du Luxembourg, Esch-sur-Alzette (LU)

(72) Inventors: Yong Geng, Esch-sur-Alzette (LU); Jan Lagerwall, Esch-sur-Alzette (LU)

(73) Assignee: Université du Luxembourg, Esch-sur-Alzette (LU)

( * ) Notice: Subject to any disclaimer, the term of this patent is extended or adjusted under 35 U.S.C. 154(b) by 77 days.

(21) Appl. No.: 17/773,783

(22) PCT Filed: Oct. 30, 2020

(86) PCT No.: PCT/EP2020/080568
§ 371 (c)(1),
(2) Date: May 2, 2022

(87) PCT Pub. No.: WO2021/089438
PCT Pub. Date: May 14, 2021

(65) Prior Publication Data
US 2022/0389317 A1 Dec. 8, 2022

(30) Foreign Application Priority Data
Nov. 4, 2019 (LU) ........................................ 101463

(51) Int. Cl.
*C09K 19/36* (2006.01)
*C09K 19/52* (2006.01)
*C09K 19/54* (2006.01)

(52) U.S. Cl.
CPC ............ *C09K 19/36* (2013.01); *C09K 19/542* (2013.01); *C09K 2019/523* (2013.01); *C09K 2019/525* (2013.01)

(58) Field of Classification Search
CPC ...................................................... C09K 19/36
See application file for complete search history.

(56) References Cited

U.S. PATENT DOCUMENTS 4,637,896 A 1/1987 Shannon
5,589,959 A 12/1996 Hikmet
(Continued)

FOREIGN PATENT DOCUMENTS

KR 20180112159 A 10/2018

OTHER PUBLICATIONS

Geng Yong et al. ("High-fidelity spherical cholesteric liquid crystal Bragg reflectors generating unclonable patterns for secure authentication" US National Library of Medicine (NLM), May 27, 2016; Scientific Reports , vol. 6, ISSN: 2045-2322) (Year: 2016).*
(Continued)

*Primary Examiner* — Chanceity N Robinson
(74) *Attorney, Agent, or Firm* — Fitch, Even, Tabin & Flannery LLP

(57) ABSTRACT

A method for producing a cholesteric liquid crystal based shell is provided. The method comprises producing a cholesteric liquid crystal shell, solidifying the cholesteric liquid crystal shell so as to obtain a solid shell and perforating the solid shell. Also provided is a cholesteric liquid crystal based solid shell comprising a perforation. A coating composition comprising a plurality of cholesteric liquid crystal based solid shells, an item comprising a tag that comprises the cholesteric liquid crystal based solid shells and a method for authenticating the item are also provided.

20 Claims, 6 Drawing Sheets

(56) References Cited

U.S. PATENT DOCUMENTS

| 5,793,456 | A | 8/1998 | Broer et al. |
|---|---|---|---|
| 6,010,643 | A | 1/2000 | Coates et al. |
| 6,034,753 | A | 3/2000 | Li et al. |
| 2002/0075434 | A1 | 6/2002 | Jiang et al. |
| 2018/0244997 | A1 | 8/2018 | Park et al. |

OTHER PUBLICATIONS

M. Mitov, "Cholesteric liquid crystals with a broad light reflection band.," Adv. Mater., vol. 24, pp. 6260-6276 (2012).
S.-Y. T. Tzeng, C.-N. Chen and Y. Tzeng, "Thermal tuning band gap in cholesteric liquid crystals.," Liq. Cryst., vol. 37, pp. 1221-1224 (2010).
P.-G. de Gennes and J. Prost, "The Physics of Liquid Crystals.," Clarendon Press, 1993 (1 page).
M. Mitov and N. Dessaud, "Going beyond the reflectance limit of cholesteric liquid crystals.," Nat. Mater., vol. 5, pp. 361-364 (2006).
J. Fan et al., "Light-directing omnidirectional circularly polarized reflection from liquid-crystal droplets," Angew. Chemie - Int. Ed, vol. 54, pp. 2160-2164 (2015).
Y. Geng et al., "High-fidelity spherical cholesteric liquid crystal Bragg reflectors generating unclonable patterns for secure authentication," Sci. Rep., vol. 6, 2016 (9 pages).
J. Noh, H. Liang, I. Drevensek-Olenik and J. P. F. Lagerwall, "Tuneable Multicoloured Patterns From Photonic Cross Communication Between Cholesteric Liquid Crystal Droplets Supporting Information," J. Mater. Chem. C, vol. 2, 2014 (7 pages).
Y. Bashtyk, O. Bojko, A. Fechan, P. Grzyb and P. Turyk, "Primary converters for optical sensors of physical values based on polymer dispersed cholesteric liquid crystal.," Mol. Cryst. Liq. Cryst., vol. 642, pp. 41-46 (2017).
G. Agez, C. Bayon and M. Mitov, "Multiwavelength micromirrors in the cuticle of scarab beetle *Chrysina gloriosa*," ACTA Biomater., vol. 48, pp. 357-367 (2017).
S.S. Lee, S. K. Kim, J.C. Won, Y. H. Kim and S. H. Kim, "Reconfigurable Photonic Capsules Containing Cholesteric Liquid Crystals with Planar Alignment," Angew. Chemie—Int. Ed, vol. 127, p. 15481-15485, 2015.
Y. Geng et al., "Through the Spherical Looking-Glass: Asymmetry Enables Multicolored Internal Reflection in Cholesteric Liquid Crystal Shells.," Adv. Opt. Mater., vol. 6, 2017 (9 pages).
JH Noh, H.-L. Liang, I. Drevensek-Olenik and J.P. F. Lagerwall, "Tuneable multicoloured patterns from photonic cross-communication between cholesteric liquid crystal droplets," J. Mater. Chem. C, vol. 2, pp. 806-810 (2014).
J. Noh, I. Drevensek-Olenik, J. Yamamoto and J.P. F. Lagerwall, "Dynamic and complex optical patterns from colloids of cholesteric liquid crystal droplets," Proc. SPIE, vol. 9384, 2015 (9 pages).
S. J. Aßhoff et al., "Superstructures of chiral nematic microspheres as all-optical switchable distributors of light," Sci. Rep., vol. 5, 2015 (10 pages).
S.S. Lee et al., "Robust microfluidic encapsulation of cholesteric liquid crystals toward photonic ink capsules," Adv. Mater., 2014 (7 pages).
E. Beltran-Gracia and O. L. Parri, "A new twist on cholesteric films by using reactive mesogen particles.," J. Mater. Chem. C, 2013 (8 pages).
D.-B. Myung and S.-Y. Park, "Optical Properties and Applications of Photonic Shells," ACS Appl., vol. 11, p. 20350, 2019.
M. Schwartz et al., "Cholesteric Liquid Crystal Shells as Enabling Material for Information-Rich Design and Architecture," Adv. Mater., vol. 30, 2018 (19 pages).
International Search Report and Written Opinion dated Jan. 28, 2021 for International Application No. PCT/EP2020/080568 (10 pages).

\* cited by examiner

CHOLESTERIC LIQUID CRYSTAL BASED SOLID SHELL AND PRODUCTION METHOD THEREOF

ACKNOWLEDGMENT

The project leading to this application has received funding from the European Research Council (ERC) under the European Union's Horizon 2020 research and innovation programme (grant agreement No 648763).

FIELD OF THE INVENTION

The invention generally relates to a cholesteric liquid crystal based solid shell and a method for producing a cholesteric liquid crystal based shell. Other aspects of the invention pertain to a coating composition and an item comprising a plurality of such cholesteric liquid crystal (CLC) based solid shells. Also, an aspect of the present invention relates to a method for authenticating an item comprising a plurality of such cholesteric liquid crystal based solid shells.

BACKGROUND OF THE INVENTION

Liquid crystals are part of our day to day life, e.g. in displays for television, computers, tablets, mobile phones, etc. A liquid crystal combines properties of liquids and crystals: it flows as a liquid but also exhibits macroscopic anisotropic properties as in crystals. This is made possible thanks to liquid crystal-forming molecules (the so-called "mesogens").

A liquid crystal-forming material can exist in different phases. For example, the liquid crystal may be in a nematic phase, in which the molecules are preferentially aligned along a common direction. The liquid crystal may also be in an isotropic liquid phase in which there is no long-range order of the alignment of the molecules. If the mesogens are chiral or if the system is chirally doped, the nematic phase becomes a chiral nematic, also called cholesteric phase. Here, the preferential alignment direction rotates continuously, such that the molecular order forms a helical structure, the axis of which is always perpendicular to the preferential molecule alignment direction.

In cholesteric liquid crystals, the helical modulation of the refractive index (due to the preferential molecular alignment direction rotating in the helical structure) gives rise to selective (Bragg) reflection of light in a narrow wavelength band, the central wavelength of which is determined by the pitch of the helix and the angle of incidence of the light. The reflected light is circularly polarized with the same handedness as the cholesteric helix [1, 2, 3, 4]. Many efforts have been made to polymerize cholesteric liquid crystals in order to make the helical structure permanent and robust, thereby significantly widening the application area [5, 6, 7, 8, 9, 10]. The majority of the work has focused on making thin films of cholesteric liquid crystal-templated polymers.

Recently, cholesteric liquid crystal were brought into spherical shape with radial helix orientation [11, 12, 13, 14, 15, 16, 17, 18, 19, 20]. In that configuration, normal incidence reflection color in a central spot can be seen regardless of the observation direction, as long as the illumination is along the observation direction.

The spheres can be made as droplets, but this often leads to deteriorated optical properties due to poorly controlled helix alignment, especially after polymerization [13, 21]. Cholesteric liquid crystal shells have been proposed to mitigate the deterioration of optical properties [12, 17]. In case of shells, only a thin layer of cholesteric liquid crystals surrounds an internal droplet of a different liquid. Cholesteric liquid crystal shells have been polymer-stabilized [16, 22] as well as polymerized entirely. The internal droplet remains inside the shell [23, 24]. It should be noted that an intricate communication pattern arises due to optical cross communication between shells when multiple spheres are arranged next to each other [12, 20, 25].

General Description

A first aspect of the invention pertains to a method for producing a cholesteric liquid crystal based shell. The method comprises producing a cholesteric liquid crystal shell, solidifying the cholesteric liquid crystal shell so as to obtain a solid shell, and perforating the solid shell.

As used herein, a "liquid crystal" is a state of matter which has properties between those of conventional liquids and those of solid crystals. In other words, a liquid crystal can flow like a liquid but has some degree of ordering in the arrangement of its molecules.

As used herein, a "cholesteric liquid crystal" (also called chiral nematic liquid crystal) is a liquid crystal that exhibits a twisting of its molecules along an axis perpendicular to the preferred orientation of the molecules.

As used herein, a "shell" is an object enclosing a space.

It will be appreciated that the first aspect of the invention opens the way to mitigate unintended light scattering at the interfaces of the solid shell, so that the circularly polarized reflected light may be more easily sensed. Up to now, there was no way to accurately control the index of refraction of the inside of the shell. Typically, the index of refraction of the inside of the shell is very different from the index of refraction of the shell (see e.g. [25]), giving rise to unintended light scattering. More particularly, the first aspect of the invention allows for easily accessing the inside of the shell.

The perforation of the solid shell may be effected by any suitable means, e.g. by puncturing the shell with a sharp object, by slicing off a fraction with a knife, by heating, by avoiding polymerization at one point or of a part of the shell, followed by dissolution of the unpolymerized fraction, by shrinking the shell during polymerization or by osmosis. Preferably, however, the perforation of the solid shell is effected by osmosis. In this case, a pressure difference across the solid shell is created by osmosis so as to perforate the solid shell. It will be appreciated that the solid shell perforation by osmosis can easily be performed since a large number of shells can be perforated in one and the same simply controlled process. This is especially true when compared to puncturing the shells one by one with a sharp object.

In particular, the perforation of the solid shell may comprise suspending the cholesteric liquid crystal shell in a first liquid so as to create a pressure difference across the solid shell by osmosis. According to an embodiment, the first liquid is a solvent, preferably a polar solvent. Preferably, the polar solvent is selected from the group consisting of: acetone, ethanol, tetrahydrofuran (THF), dioxane, dimethylformamid (DMF), ethanone and a combination thereof.

Preferably, the method for producing a cholesteric liquid crystal based shell comprises filling the cholesteric liquid crystal shell with an index-matching material through the perforation. Preferably, the cholesteric liquid crystal shell is completely filled with an index-matching material. As used herein, an "index-matching material" is a material that has an index of refraction close to the ones of the liquid crystal. It should be noted that a liquid crystal is optically anisotropic and, in particular, is birefringent. An index-matching material in that context is a material that has an index of refraction which is within a tolerance 10%, preferably 5%, of the arithmetic means of the extraordinary index of refraction and the ordinary index of refraction of the cholesteric liquid crystal based shell.

The production of the cholesteric liquid crystal shell may comprise:

forming a cholesteric liquid crystal shell by surrounding a droplet of a second liquid with a cholesteric liquid crystal, the second liquid and the cholesteric liquid crystal being immiscible; and suspending the cholesteric liquid crystal shell in a third liquid, the third liquid and the cholesteric liquid crystal being immiscible.

As used herein, "immiscible" means that the cholesteric liquid crystal and the second liquid (or the third liquid) are unable to form a homogeneous solution when mixed together.

According to an embodiment, the second liquid and the third liquid may be the same liquid.

Preferably, the second liquid and the third liquid comprise an interface stabilizer. The method may comprise removing the stabilizer from the inner surface and outer surface of the perforated solid shell, preferably by rinsing out the stabilizer from the perforated solid shell. According to a preferred embodiment, the liquid used for rinsing out the stabilizer is miscible with the stabilizer. As used herein, "miscible" means that the liquid used for rinsing out the stabilizer and the stabilizer form a homogeneous solution when mixed together.

According to an embodiment, the cholesteric liquid crystal comprises mesogenic moieties and chiral moieties. The chiral moieties may be added as chiral dopants or they may be the mesogenic moieties themselves.

According to an embodiment, the cholesteric liquid crystal comprises a blend of mesogenic moieties.

The second and/or the third liquid may be water-based and preferably contain glycerol.

The stabilizer may be selected from the group consisting of polyvinyl alcohol) (PVA), polyvinylpyrrolidone, polyacrylic acid, PLURONIC® F-127 surfactant from BASF (having a linear formula $(C_3H_6O—C_2H_4O))_x$), or a combination thereof.

A second aspect of the invention pertains to a cholesteric liquid crystal based solid shell comprising a perforation. The cholesteric liquid crystal based solid shell preferably is produced to a method according to the first aspect of the invention.

The cholesteric liquid crystal based solid shell may have an uneven thickness. The perforation may be located at the thinnest point of the shell.

Preferably, the solid shell is filled with an index-matching material.

The orientation of the mesogenic moieties may be modulated into a helix along an axis perpendicular to the inner surface and/or the outer surface of the shell.

According to an embodiment of the invention, the diameter of the shell may be comprised in the interval from 5 μm to 200 μm, preferably in the interval from 10 μm to 150 μm and more preferably in the interval from 20 μm to 50 μm.

In an embodiment, the cholesteric liquid crystal based solid shell has wavelength-selective reflections in the UV band (i.e. a wavelength comprised in the range from 10 nm to 400 nm), in the IR band (i.e. a wavelength comprised in the range from 700 nm to 1 mm), or in the visible band (i.e. a wavelength comprised in the range from 400 nm to 700 nm). In an embodiment, the cholesteric liquid crystal based solid shell may have wavelength-selective reflections in the near-IR band (i.e. a wavelength comprised in the range from 700 nm to 5 μm) or in the mid-IR band (i.e. a wavelength comprised in the range from 5 μm to 25 μm). In another embodiment, the cholesteric liquid crystal based solid shell may have wavelength-selective reflections in the UVA band (i.e. a wavelength comprised in the range from 315 nm to 400 nm), in the UVB band (i.e. a wavelength comprised in the range from 280 nm to 315 nm) or in the UVC band (i.e. a wavelength comprised in the range from 100 nm to 280 nm).

A third aspect of the invention pertains to a coating composition comprising a plurality of cholesteric liquid crystal based solid shells according to the second aspect of the invention. The solid shells are immersed in an index-matching liquid material. The solid shells may be filled, preferably completely filled, with the index-matching liquid material.

A fourth aspect of the invention pertains to an item comprising a tag. The tag comprises cholesteric liquid crystal based solid shells according to the second aspect of the invention.

A fifth aspect of the invention pertains to a method for authenticating the item according to the fourth aspect of the invention. The method comprises sensing the electromagnetic response of the tag to an electromagnetic stimulus.

BRIEF DESCRIPTION OF THE DRAWINGS

By way of example, preferred, non-limiting embodiments of the invention will now be described in detail with reference to the accompanying drawings, in which.

The reader's attention is drawn to the fact that the drawings are not to scale. Furthermore, for the sake of clarity, proportions between height, length and/or width may not have been represented correctly.

DETAILED DESCRIPTION OF PREFERRED EMBODIMENTS OF THE INVENTION

Figure 1:
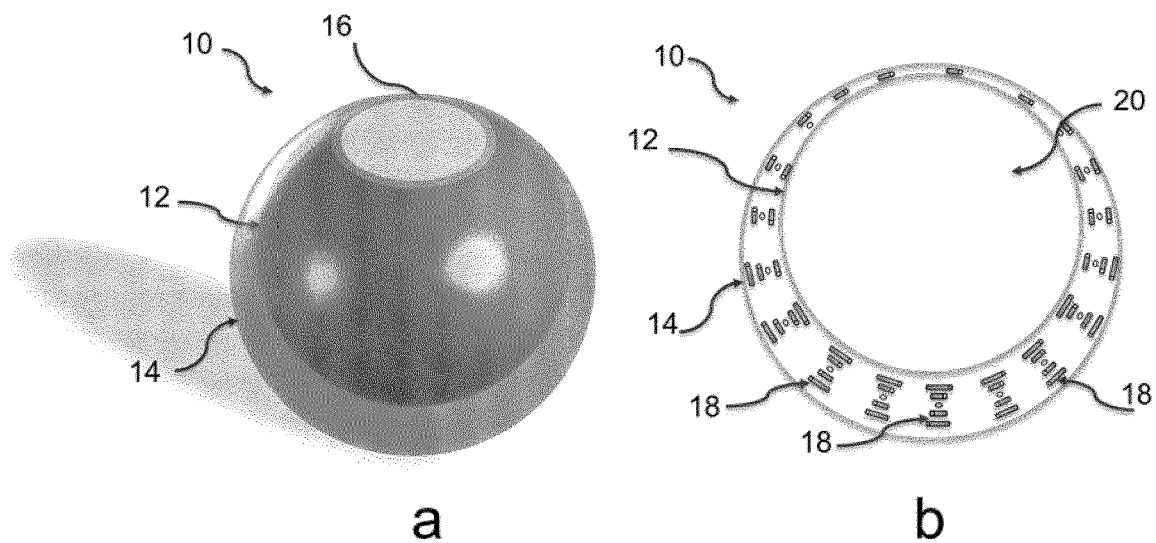
FIG. 1: schematically illustrates two shells according to an embodiment of the present invention.

A solid reflector shell 10 according to an embodiment of the invention is schematically depicted in FIGS. 1(a) and (b). The shell 10 comprises an inner surface 12, an outer surface 14 and a perforation 16 thereby allowing for accessing the core 20 of shell 10. The thickness of the shell is uneven. For example, in FIGS. 1(a) and (b), the top of the shell 10 is thinner than the bottom of the shell 10. The shell 10 is produced using a cholesteric liquid crystal (CLC) as a template, i.e. the solid shell 10 is produced based on a liquid crystal (LC) that is in a cholesteric phase. The CLC is used as a template 18 for the solid reflector shell 10. For clarity reasons, the perforation is not represented in FIG. 1(b).

According to an embodiment, the CLC precursor mixture comprises (a blend of) reactive mesogens, a chiral dopant and a photo-initiator. The chiral dopant may be polymerizable or not.

For example, the reactive mesogens may be 4'-hex-5-enyloxy-biphenyl-4-carbonitrile (RM1 in FIG. 2), with a melting point around 30° C. RM1 allows for bringing down the melting point of the mixture. Other reactive mesogens may be 6-(4-cyano-biphenyl-4'-yloxy) hexyl acrylate (RM2 in FIG. 2), with a melting point around 70° C., and 1,4-bis-[4-(3-acryloyloxypropyloxy) benzoyloxy]-2-methylbenzent (RM257 in FIG. 2) and 4-Methoxybenzoic acid 4-(6-acryloyloxyhexyloxy)phenyl ester (RM520). The above reactive mesogens are commercially available from SYNTHON GmbH, Germany. According to another embodiment, the above reactive mesogens may be replaced by other reactive mesogens or combined with other reactive mesogens, such as: acrylic acid 2-(4'-cyano-biphenyl-4-yloxy)ethyl ester, 4[4[6-Acryloxyhex-1-yl]oxyphenyl]carboxybenzonitrile, 4-Methoxybenzoic acid 4-(6-acryloyloxyhexyloxy)phenyl ester, 4-(6-Acryloxy-hex-1-yl-oxy)phenyl 4-(hexyloxy)benzoate, 4-(6-(acryloyloxy)hexyloxy)phenyl 4'-(4-pentylcyclohexyl)biphenyl-4-carboxylate.

Figure 2:
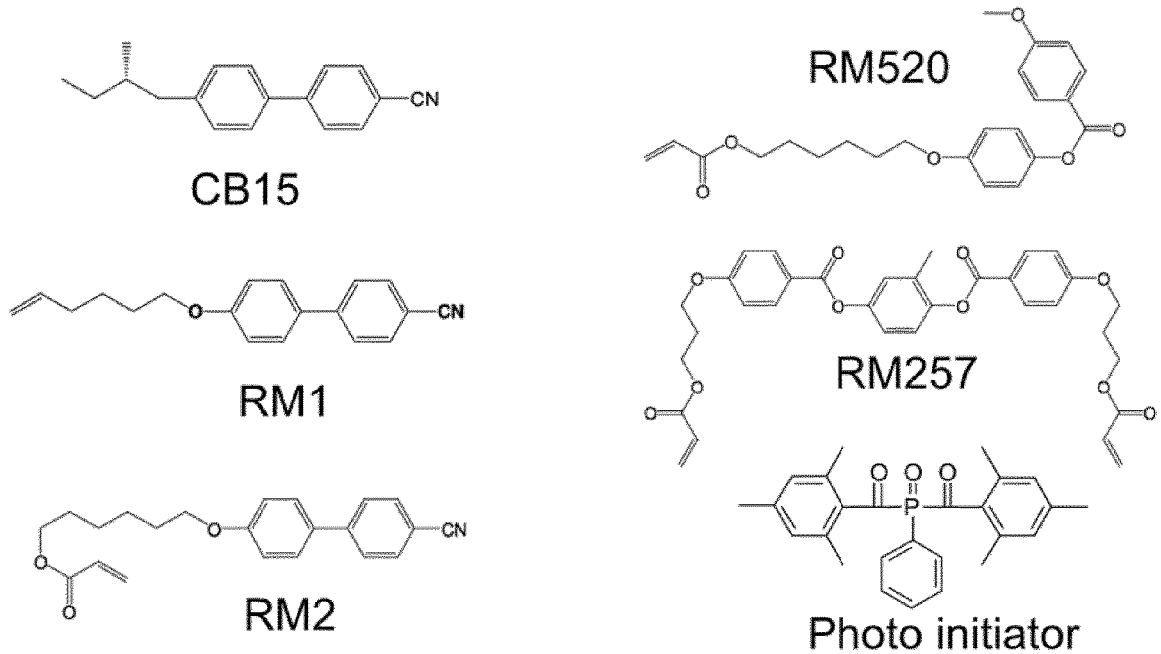
FIG. 2: schematically depicts the chemical structures of the chiral dopant (CB15), reactive mesogens (RM1, RM2, RM520, RM257) and the photo initiator used in an exemplary CLC precursor mixture.

As shown in FIG. 2, the molecules of RM1 and RM2 share the same rigid part but have different flexible tail length. This increases the homogeneity of the polymerised structure by counteracting phase separation during the polymerisation process. RM520 has been used for the same purpose; its rigid core is chemically similar to RM257 but it is significantly shorter. According to a preferred embodiment, the CLC precursor mixture comprises 15% by weight of RM1, 15% by weight of RM2, 40% by weight of RM257 and 30% by weight of RM520 based on the total amount of reactive mesogens in the mixture.

The chiral dopant may for example be (S)-4-cyano-4'-(2-methylbutyl) biphenyl (CB15 in FIG. 2). CB15 is not polymerizable. The above chiral dopant is commercially available from SYNTHON GmbH, Germany. The chiral dopant is added to the reactive mesogen mixture. The weight ratio of the chiral dopant (CB15) and the reactive mesogens (RM1, RM2, RM257, RM520) in the CLC precursor mixture according to the preferred embodiment is comprised in the interval from 0.1 to 0.5, preferably from 0.15 to 0.4, even more preferably from 0.2 to 0.35. The period of the helix of the CLC (i.e. the pitch of the helix) can be tuned by the chiral dopant concentration. This, in turn, allows for tuning the reflection band of the solid shell 10. For example, a red reflecting solid shell 10 may be obtained with a weight ratio of the chiral dopant and the mesogens of 0.26. A green reflecting solid shell 10 may be obtained with a ratio of 0.304 and a blue reflecting solid shell 10 may be obtained with a ratio of 0.333. It should be noted that the concentration of chiral dopant CLC precursor mixture may also be tuned so that the solid shell reflects outside the visible band (e.g. in the infrared (IR) or the ultraviolet (UV) band).

The CLC precursor mixture may additionally or alternatively comprise other chiral dopants such as R- or S-2-Octyl 4-[4-(Hexyloxy)Benzoyloxy]Benzoate (R- or S-811). Examples of polymerizable chiral dopants are: (S)-6-(4'-cyanobiphenyl-4-yloxy)-4-methylhexyl acrylate, or 4-(3-Acryloyloxypropyloxy)-benzoesure 2-methyl-1, 4-phenylester.

The polymerization initiator may be a UV photo-initiator, a visible photo-initiator, or any other suitable initiator (such as a catalyst, heating, change of pH, . . . ). For example, the initiator may be IRGACURE® 819 (commercially available from Ciba Specialty Chemicals, Switzerland), which is a UV photo-initiator that allows the polymerisation to be triggered by UV light exposure.

According to an embodiment, the initiator is added to the mixture so that the weight percentage of initiator in the CLC precursor mixture is comprised in the interval from 1% to 10%, preferably in the interval from 3% to 7%. According to a preferred embodiment, a photo-initiator is added to the mixture so that the photo-initiator comprises 5% by weight of the CLC precursor mixture.

The melting point of the mixture according to the preferred embodiment (i.e. comprising 15% by weight of RM1, 15% by weight of RM2, 40% by weight of RM257 and 30% by weight of RM520 based on the total amount of reactive mesogens in the mixture, CB15 and 5% by weight of the CLC precursor mixture) is around 20° C. and the clearing point (cholesteric liquid crystal to isotropic liquid transition) is around 35° C.

Figure 3:
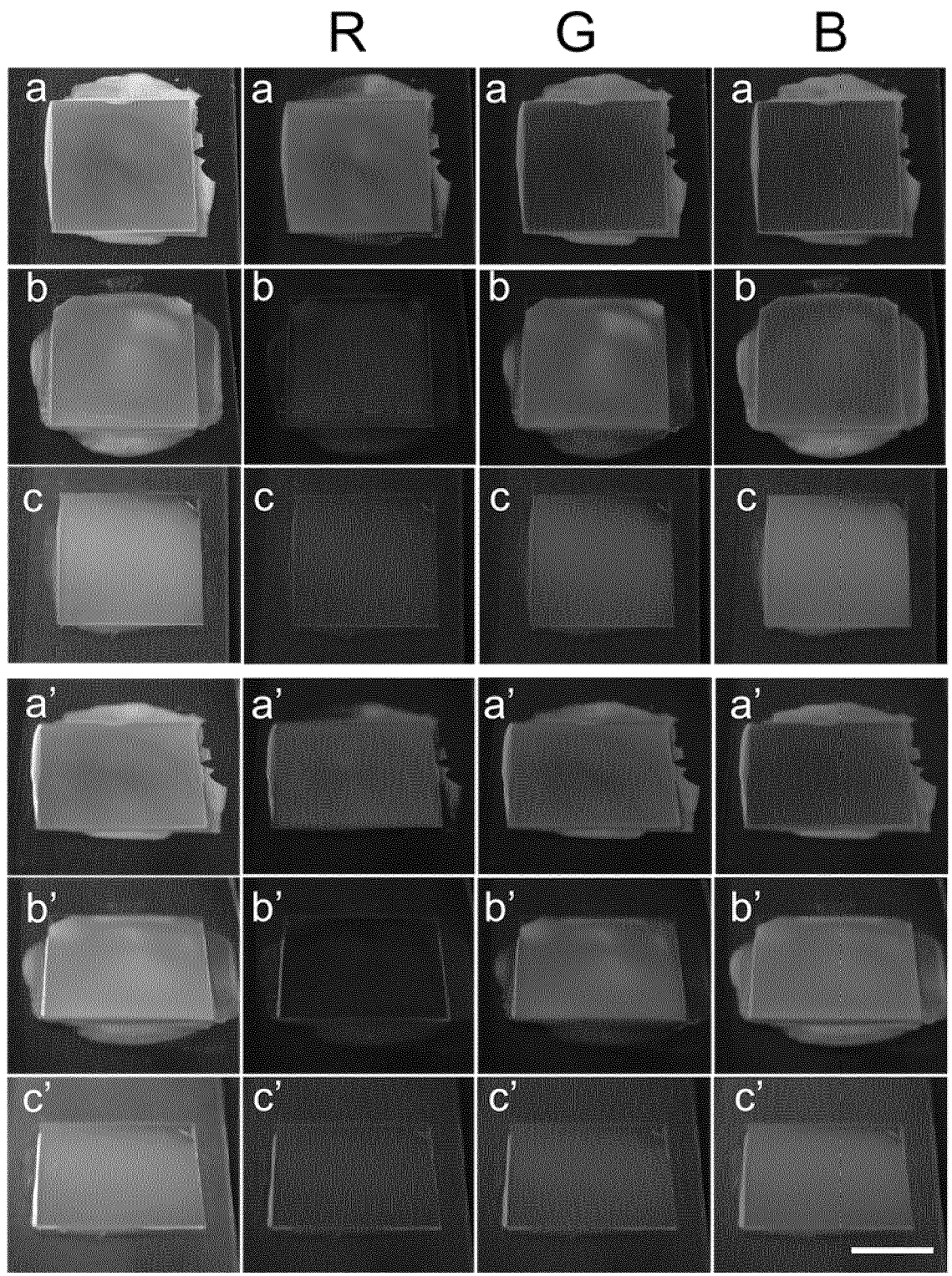
FIG. 3: illustrates CLC based solidified flat films, giving red, green and blue normal selective reflection colours (a, b and c) and orange, cyan and ultraviolet colour under oblique view (a', b' and c')
Figure 4:
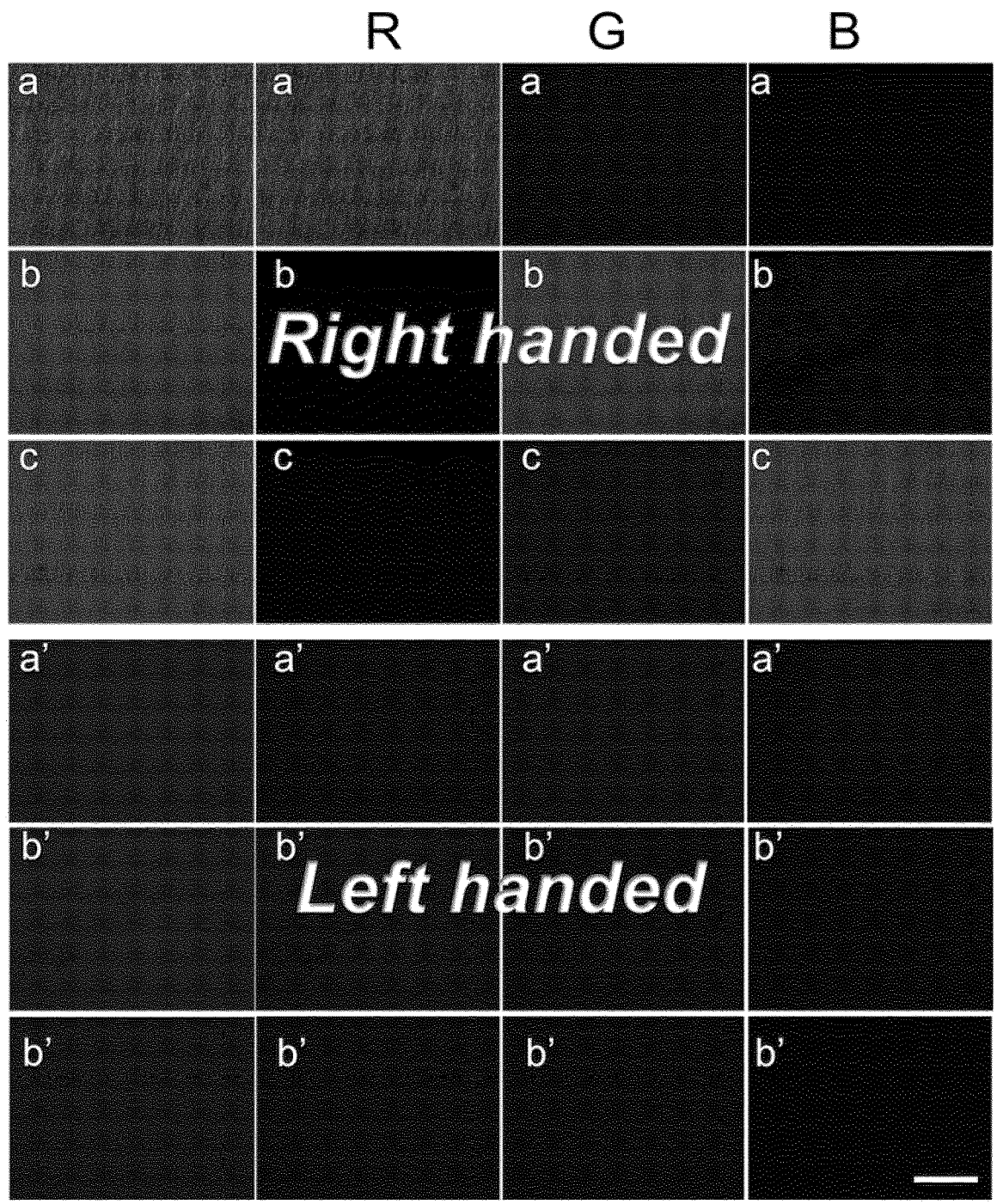
FIG. 4: illustrates microscopy images of three different coloured solid film under right-(a, b and c) and left (a', b', c')-handed circular polarized light illumination.

To test the optical properties, each CLC precursor mixture (i.e. the above-mentioned red, blue and green CLC precursor mixture) is sandwiched between two flat glass slides and kept at 32° C. for one hour for relaxation and then polymerized by exposition to UV light. A UVATA LED UV curing system (delivering 8800 mW/cm$^2$ at full power) is used to initiate the polymerization process. The system is equipped with an optical fiber head, which is held 2 cm away from the sample, with the beam normal to the sample plane. As shown in FIG. 3(a), (a'), (b), (b'), (c) and (c'), the polymerized films maintain a uniform CLC structure with three different pitches, giving red (FIG. 3(a)), green (FIG. 3(b)) and blue (FIG. 3(c)) normal reflection colors (see in particular the R, G and B columns illustrating the R, G and B channels of the photographs located in the first column). Corresponding blue shifted colors are observed in FIG. 3 (a'), (b') and (c') with oblique view, as expected, considering that the colors are due to Bragg reflection and that these samples are flat, not spherical. The scale bar in FIG. 3 corresponds to 1 cm. The reflected light is right-handed circularly polarized, as demonstrated in FIG. 4. FIG. 4 shows microscopy images of the above three samples under right-handed circular polarized light illumination (a, b and c) and left-handed circular polarized light illumination (a', b', c'). In FIG. 4, the photographs of the first column is decomposed in their respective R, G, B channels. While the right-handed circular polarized light is reflected by the samples, the left-handed circular polarized light is not reflected by the samples. In FIG. 4, the scale bar corresponds to 100 μm.

A glass based capillary microfluidic device (see FIG. 5(a)) is used to produce cholesteric liquid crystal shells from the CLC precursor mixture. It should be noted that any other suitable methods may be used for producing cholesteric liquid crystal shells from the CLC precursor mixture. With reference to FIG. 5(a), two cylindrical capillaries are inserted from two sides into a capillary with square cross section, the inner side length of which is equal to the outer diameter of the cylindrical capillaries. Both cylindrical capillaries are tapered toward the inside. The inner isotropic phase, which will form the droplets holding up the LC shells, is pumped through one of them, and the LC (immiscible with the inner phase) is pumped in the same direction through the corners of the square capillary surrounding the cylindrical one. From the other side of the square capillary the outer phase (also immiscible with the LC) is pumped in the opposite direction, in the corners surrounding the other cylindrical capillary. The latter functions as collection tube for the final double emulsion. At the junction where the LC with coflowing inner fluid meets the counterflowing outer phase, the former stream is flow-focused into the orifice of the collection tube. The composite stream breaks up due to the Rayleigh-Plateau instability, giving rise to composite droplets with the inner isotropic phase at the core, surrounded by a layer of LC, and suspended in the outer isotropic phase (see FIG. 5(b)).

The shell production may be monitored using a high-speed video camera mounted on an inverted microscope with red illumination. The microfluidic set-up may be mounted in a heating stage for ensuring that the LC is in the cholesteric liquid crystalline phase or in the isotropic phase during the production. Here, the shells are produced at 32° C. In order to stabilize the CLC shells and mitigate the collapse of the CLC shells, a water-soluble polymer, poly (vinyl alcohol) (PVA, W-13,000-23,000 g/mol, 88-89% hydrolysed, Sigma-Aldrich), is added to the inner and outer isotropic phases as interface stabilizer. In the embodiment depicted in FIG. 5(a), both the inner and outer phases are water-based, containing glycerol, and poly(vinyl alcohol) (PVA). Of course, any other suitable interface stabilizers may be used, as long as they do not induce an undesirable alignment of the liquid crystal. Other examples are polyvinylpyrrolidone (PVP), polyacrylic acid (PAA) or, within certain temperature ranges, the PLURONIC® surfactant series from BASF, such as F127.

After production, the shells are collected into a 20 ml vial covered with aluminum foil, at 32° C. The vial is transferred into an incubator for relaxation (also referred to as annealing). These steps are carried out in yellow room to avoid exposure to light of low wavelength, which could trigger premature polymerization. The vial is kept at 32° C. in order to avoid crystallization of the shells.

Due to the density mismatch between the lighter inner isotropic liquid and the heavier surrounding CLC mixture, the shells are asymmetric with a thin top and thick bottom. Of course, the reverse asymmetry, arising when the inner fluid is heavier than the CLC mixture, is also possible.

Figure 5:
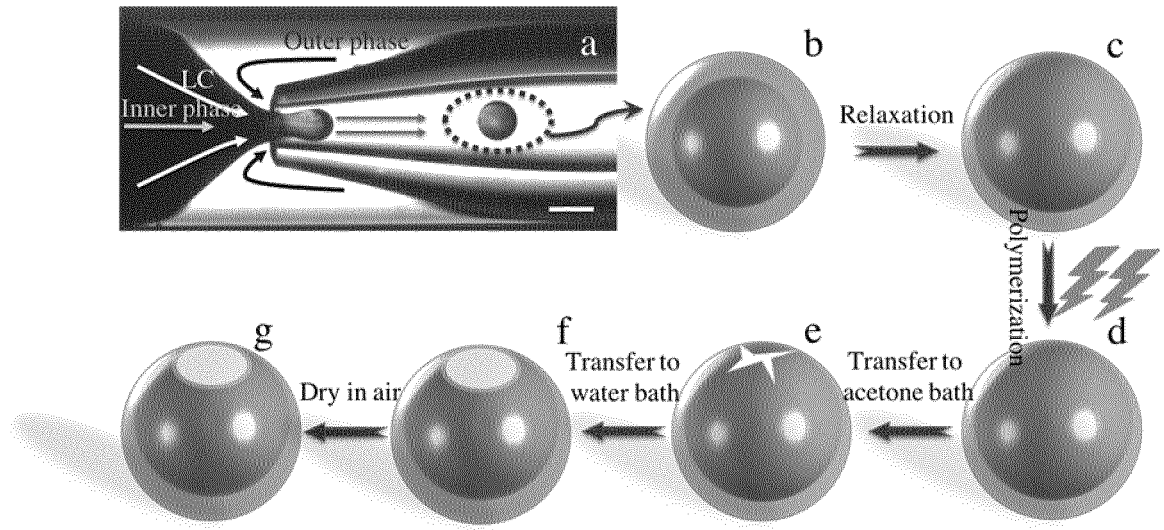
FIG. 5: shows the solid shell production process according to an embodiment of the present invention.

After a period ranging from hours to days of annealing for ensuring a radial helix alignment (see FIG. 5 (b)-(c)), the polymerisation process is initiated by shining UV light on the samples (see FIG. 5 (c)-(d)). If initiators other than photo-initiators are used, then the corresponding trigger (e.g. heating, pH change, catalyst addition, . . . ) is provided at this stage. No significant deterioration of the helix structure and the resulting optical properties are observed.

In the next step (see FIG. 5 (d)-(e)), the outer isotropic phase is replaced by acetone by multiple dilutions of the outer isotropic phase with pure acetone, followed by removal of excess outer isotropic phase, until the water is completely removed. The replacement of the outer isotropic phase by acetone initiates a solvent exchange process. Because the internal phase within the shell contains solutes (here PVA and glycerol), an osmotic flow of acetone into the core of the shell is created. The thinnest point of the shells breaks due to the osmotic pressure (see FIG. 5(e)). The shells are now perforated. Specifically, each of the shells now comprises a single perforation. The cores of the shells are now in fluid communication with the environment.

It should be noted that since the shells are fully polymerized (apart from the chiral dopant), they are stable to acetone exposure and retain the CLC-generated order. In this embodiment, the chiral dopant is removed in the process, allowing it to be recovered for future reuse. In embodiments where the chiral dopant is polymerizable, the polymerized chiral dopant makes integral part of the shell and is thus not removed.

According to a preferred embodiment, the replacement of the outer isotropic phase is carried out in the following way. After polymerisation, the shells are washed using acetone at least 10 times to remove the water. Each time, the shells are immersed into 20 ml acetone in a vial. Due to their higher density, the shells sink to the vial bottom. After about 5 minutes, the upper liquid is removed and the vial is filled with pure acetone again. The process is repeated.

It will be appreciated that any suitable liquid, or combination of liquids, other than acetone may be used. By "suitable liquid", it should be understood that the liquid should be miscible with the outer isotropic phase. In particular, polar solvents are preferred if the original outer phase is water or water-based. For example, the polar solvent may be selected from the group consisting of: acetone, ethanol, tetrahydrofuran (THF), dioxane, dimethylformamid (DMF), ethanone and a combination thereof.

Figure 6:
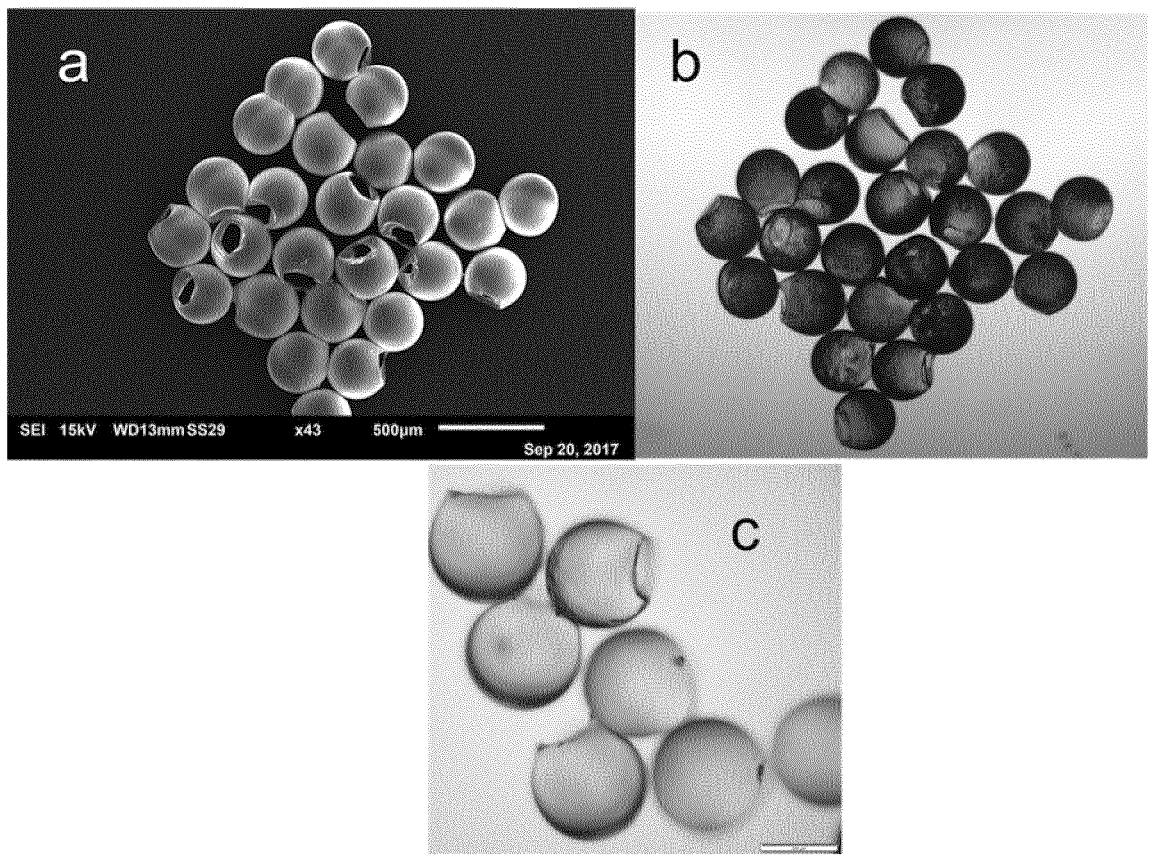
FIG. 6: depicts solidified shells with stabilizer (PVA) on its surfaces (a) by scanning electron microscopy (a) and by transmission optical microscopy (b) as well as solidified shells without stabilizer by transmission optical microscopy (c)

After the acetone treatment, the PVA is still present and it condenses onto the shell surfaces due to its poor solubility in acetone. For this reason, a second solvent exchange step is carried out, in the reverse direction, now diluting multiple times (e.g. two or three times) with distilled water until the shells are surrounded by and filled with water. The PVA dissolves easily in the water and is thus removed, leaving solid shells with a smooth surface and retaining the CLC-generated order. FIG. 6 depicts the difference between shells with PVA on its surfaces (see FIG. 6(b)) and shells after PVA removal (see FIG. 6(c)), as seen in transmission optical microscopy (scale bar corresponds to 200 µm in FIG. 6(c)). The PVA remaining on the shell surfaces gives black shadows when viewed with a microscope in transmission mode. After removal of the PVA, no shadows are left on the shells, as shown in FIG. 6(c). Also, FIG. 6(a) shows the shells as seen in scanning electron microscopy (scale bar corresponds to 500 µm in FIG. 6(a)).

The water is then evaporated, yielding high-quality single-point perforated solid shells.

The produced shells can be dispersed in an index-matching liquid material that can now fully surround the cholesteric liquid crystal based solid shells, in particular that can now also fill the inside (i.e. the core) of the shells through the perforation. Care needs to be taken to remove air from the inside of the shells. According to an embodiment, the shells are dispersed into (a small amount of) acetone again, then the index-matching liquid material is added into the dispersion. The dispersion is then mixed. In a second step, the acetone is evaporated. If the viscosity of the reactive liquid is too high, vacuum is needed to help remove the air before acetone evaporation.

The index-matching liquid material may be UV- or e-beam-curable. In a preferred embodiment, the commercial UV-curing glue of Norland Optical Adhesive is used (NOA81). After curing, a transparent scattering-free solid film comprising cholesteric liquid crystal based solid shells is obtained.

Figure 7:
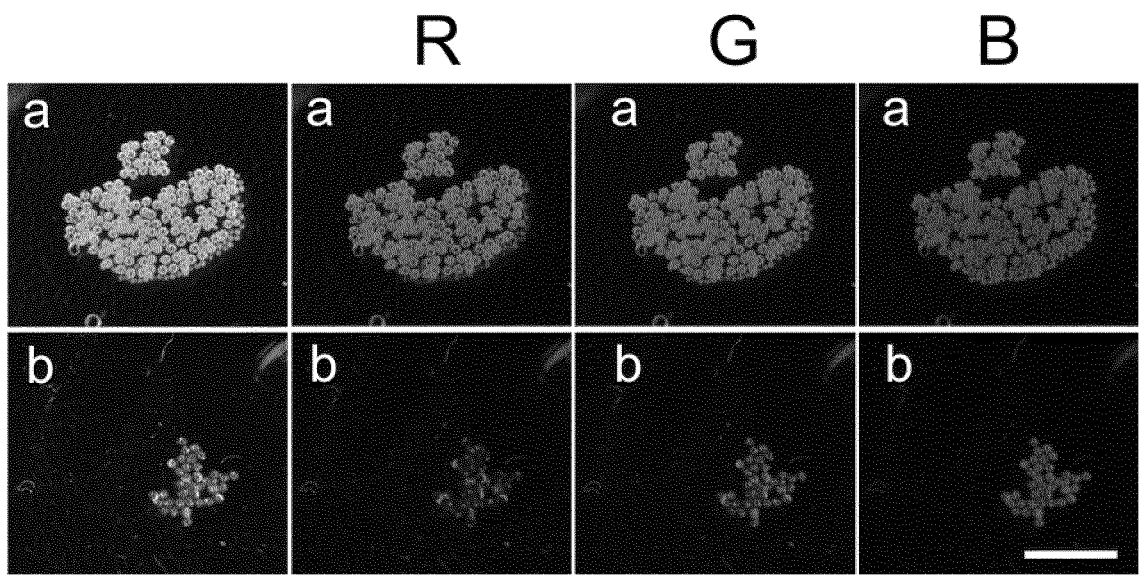
FIG. 7: illustrates the effect of a refractive index mismatch (a) and match (b) between the solidified shells and the surrounding medium.

FIG. 7 illustrates the difference between an index-mismatched (a) and an index-matching (b) material surrounding both the inside and the outside of the solid shells. The R, G and B channels of the image located in the left column are provided. In particular, solid shells contain and are surrounded by air in (a) and by NOA81 glue in (b). Due to the larger effective refractive index of the shell compared to air, significant unselective reflection of white light at both surfaces of the shells are observed. As shown in FIG. 7(a), the selective reflection is almost covered by the white light reflections at the inner and outer surfaces of the shells in air. This results in a white "bubble" appearance with only very weak blue selective reflection spots on the top center of each shell. Surrounding the shells are polymerized droplets, thus without the shell structure and thus with consequent poorer control of the helix orientation. Despite their inherently poorer optical properties, they appear stronger colored than the shells, because they do not suffer from the unselective reflections that take place in the core of the shell (filled with air). However, when the shells are filled with and incorporated into a matrix with a refractive index-matching material, the unselective white reflections are minimized and the selective reflections dominate, as shown in FIG. 7(b). In the embodiment depicted in FIG. 7(b), the shells are dispersed in NOA81 glue with refractive index around 1.56. Some small white regimes demonstrate that the air was not perfectly removed prior to curing of the glue, but all shells have a strong blue color, demonstrating that glue entered through the opening of every shell. Preferably, the shells are completely filled with the index-matching liquid material.

Figure 8:
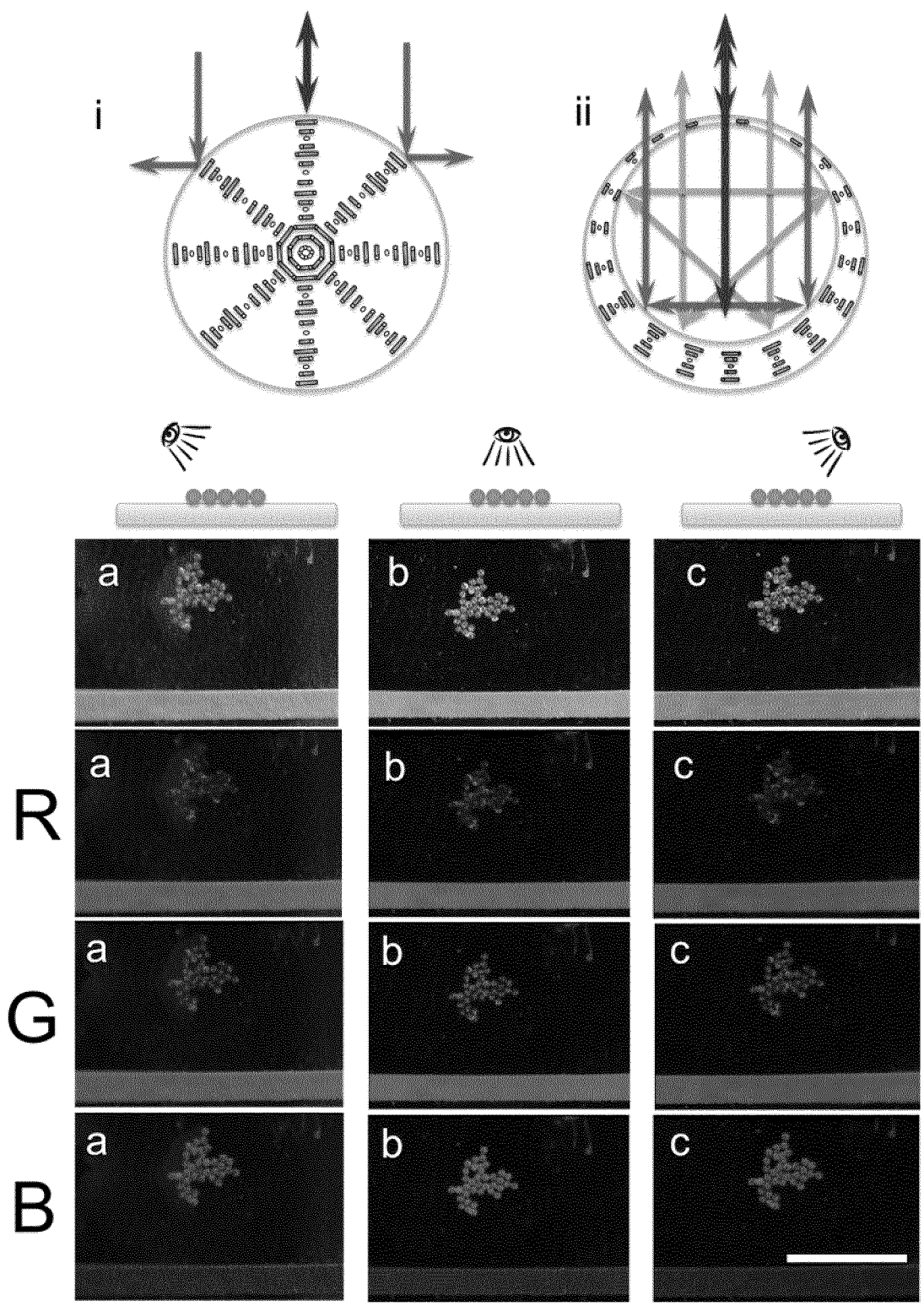
FIG. 8: schematically illustrates the viewing angle-independent color of the central reflection in CLC droplets (i) and shells. (ii); photos (a), (b) and (c) are pictures of a group of blue reflecting shells taken from different viewing angles.

It should be noted that when bringing a CLC into the curved or spherical shape, normal incidence reflection color in a central spot can be seen regardless of the observation direction, as long as the illumination is along the observation direction. This is because at the center of the sphere, the observation direction is always along the helix axis (see e.g. droplets in [23]). Due to the poorer optical quality of droplets, the efficiency of selective reflection is low. The central spots are originally from the selective reflection with very narrow wavelength band gap ($\Delta\lambda$=p $\Delta$n, $\Delta\lambda$ is the wavelength band gap, p is the pitch of the CLC and $\Delta$n is the birefringence of the LC material). Furthermore, the reflected light is one handed circular polarized light (e.g. left or right handed circular polarized light), which reduces the light intensity by 50%. Using shells instead of droplet, selective reflection is enhanced significantly as schematically show in FIG. 8 (i) and (ii). The direct central selective reflection originates not only from the central spot at the top of the shell, but also from the bottom center. Also, the light can be multiply selectively reflected on the shell inside, and comes back to the incident direction. In this case, the selective reflection is much stronger, even with wider selective reflection band. If the viewing angle changes, the reflection color is identical, due to their angle-independent selective reflection property, as shown in FIG. 8 (a), (b) and (c) (see the respective R, G and B channels).

According to an embodiment of the present invention, a plurality of cholesteric liquid crystal based solid shells may be immersed in an index-matching liquid material as a coating composition. The coating composition may be applied to an item (e.g. jewels, paintings) and solidified (e.g. UV-cured in case of NOA81), thereby forming a tag that can be sensed. Preferably, the pitch of the cholesteric liquid crystal based solid shells is tuned so that the electromagnetic response of the shell to an electromagnetic stimulus is outside the visible spectrum.

While specific embodiments have been described herein in detail, those skilled in the art will appreciate that various modifications and alternatives to those details could be developed in light of the overall teachings of the disclosure. Accordingly, the particular arrangements disclosed are meant to be illustrative only and not limiting as to the scope of the invention, which is to be given the full breadth of the appended claims and any and all equivalents thereof.

REFERENCES

[1] M. Mitov, "Cholesteric liquid crystals with a broad light reflection band," *Adv. Mater.*, vol. 24, p. 6260, 2012.
[2] S.-Y. T. Tzeng, C.-N. Chen and Y. Tzeng, "Thermal tuning band gap in cholesteric liquid crystals," *Liq. Cryst.*, vol. 37, p. 1221, 2010.
[3] P.-G. de Gennes and J. Prost, The Physics of Liquid Crystals, Clarendon Press, 1993.
[4] M. Mitov and N. Dessaud, "Going beyond the reflectance limit of cholesteric liquid crystals," *Nat. Mater.*, vol. 5, p. 361, 2006.
[5] Y. Jiang and A. Hochbaum, *Cholesteric liquid crystal polarizing device*, US 2002/075434.
[6] D. J. Broer and J. Lub, "Cholesteric polarizer and the manufacture thereof". U.S. Pat. No. 5,793,456.
[7] R. Hikmet, "Optical modulation device having a polymer network containing free molecules of a chiral liquid crystalline material". U.S. Pat. No. 5,589,959.
[8] L. Li, Y. Jiang and S. M. Faris, "ircularly polarizing reflective material having super broad-band reflection and transmission characteristics and method of fabricating and using same in diverse applications". U.S. Pat. No. 6,034,753.
[9] P. J. Shannon, "Polymeric liquid crystals". U.S. Pat. No. 4,637,896.
[10] D. Coates and A. L. May, "Cholesteric polymer network". U.S. Pat. No. 6,010,643.
[11] J. Fan, "Light-directing omnidirectional circularly polarized reflection from liquid-crystal," *Angew. Chemie—Int. Ed*, vol. 54, p. 2160, 2015.
[12] Y. Geng, "High-fidelity spherical cholesteric liquid crystal Bragg reflectors generating unclonable patterns for secure authentication," *Sci. Rep.*, vol. 6, p. 26840, 2016).
[13] J. Noh, H. Liang, I. Drevensek-Olenik and J. P. F. Lagerwall, "Tuneable Multicoloured Patterns From Photonic Cross Communication Between Cholesteric Liquid Crystal Droplets SUPPORTING INFORMATION," *J. Mater. Chem. C*, vol. 2, p. 1, 2014.
[14] Y. Bashtyk, O. Bojko, A. Fechan, P. Grzyb and P. Turyk, "Primary converters for optical sensors of physical values based on polymer dispersed cholesteric liquid crystal," *Mol. Cryst. Liq. Cryst.*, vol. 642, p. 41, 2017.
[15] G. Agez, C. Bayon and M. Mitov, "Multiwavelength micromirrors in the cuticle of scarab beetle *Chrysina gloriosa*," *ACTA Biomater.*, vol. 48, p. 357, 2017.
[16] S. S. Lee, S. K. Kim, J. C. Won, Y. H. Kim and S. H. Kim, "Reconfigurable Photonic Capsules Containing Cholesteric Liquid Crystals with Planar Alignment," *Angew. Chemie—Int. Ed*, vol. 54, p. 15266, 2015.
[17] Y. Geng, "Through the Spherical Looking-Glass: Asymmetry Enables Multicolored Internal Reflection in Cholesteric Liquid Crystal Shells," *Adv. Opt. Mater.*, vol. 6, 2018.
[18] J. Fan, "Light-directing omnidirectional circularly polarized reflection from liquid-crystal droplets," *Angew. Chem.—Int. Ed*, vol. 54, p. 2160, 2015.
[19] J. Noh, H.-L. Liang, I. Drevensek-Olenik and J. P. F. Lagerwall, "Tuneable multicoloured patterns from photonic cross-communication between cholesteric liquid crystal droplets," *J. Mater. Chem. C*, vol. 2, p. 806, 2014.
[20] J. Noh, I. Drevensek-Olenik, J. Yamamoto and J. P. Lagerwall, "Dynamic and complex optical patterns from colloids of cholesteric liquid crystal droplets," *Proc. SPIE*, vol. 9384, p. 93840T, 2015.

[21] S. J. Aßhoff, "Superstructures of chiral nematic microspheres as all-optical switchable distributors of light," *Sci. Rep.*, vol. 5, p. 14183, 2015.

[22] S. S. Lee, "Robust microfluidic encapsulation of cholesteric liquid crystals toward photonic ink capsules," *Adv. Mater.*, vol. 27, p. 627, 2015.

[23] E. Beltran-Gracia and O. L. Parri, "A new twist on cholesteric films by using reactive mesogen particles," *J. Mater. Chem. C*, vol. 3, p. 11335, 2015.

[24] D.-B. Myung and S.-Y. Park, "Optical Properties and Applications of Photonic Shells," *ACS Appl.*, vol. 11, p. 20350, 2019.

[25] M. Schwartz, "holesteric Liquid Crystal Shells as Enabling Material for Information-Rich Design and Architecture," *Adv. Mater.*, vol. 30, p. 1707382, 2018.

The invention claimed is:

1. A method for producing a cholesteric liquid crystal based shell comprising:
    producing a cholesteric liquid crystal shell;
    solidifying the cholesteric liquid crystal shell so as to obtain a solid shell; and
    perforating the solid shell.

2. The method for producing a cholesteric liquid crystal based shell according to claim 1, wherein the perforation of the solid shell comprises creating a pressure difference across the solid shell by osmosis so as to perforate the solid shell.

3. The method for producing a cholesteric liquid crystal based shell according to claim 2, wherein the perforation of the solid shell comprises suspending the cholesteric liquid crystal shell in a first liquid so as to create a pressure difference across the solid shell by osmosis, the first liquid being a solvent.

4. The method for producing a cholesteric liquid crystal based shell according to claim 3, wherein the solvent is a polar solvent.

5. The method for producing a cholesteric liquid crystal based shell according to claim 1, comprising filling the cholesteric liquid crystal shell with an index-matching material through the perforation.

6. The method for producing a cholesteric liquid crystal based shell according to claim 1, wherein the production of the cholesteric liquid crystal shell comprises
    forming a cholesteric liquid crystal shell by surrounding a droplet of a second liquid with a cholesteric liquid crystal, the second liquid and the cholesteric liquid crystal being immiscible; and
    suspending the cholesteric liquid crystal shell in a third liquid, the third liquid and the cholesteric liquid crystal being immiscible.

7. The method for producing a cholesteric liquid crystal based shell according to claim 6, wherein the second liquid and the third liquid comprise an interface stabilizer, the method comprising removing the stabilizer from the inner surface and outer surface of the perforated solid shell.

8. The method for producing a cholesteric liquid crystal based shell according to claim 1, wherein the cholesteric liquid crystal comprises mesogenic moieties and chiral moieties.

9. The method for producing a cholesteric liquid crystal based shell according to claim 7, wherein the cholesteric liquid crystal comprises a blend of mesogenic moieties.

10. The method for producing a cholesteric liquid crystal based shell according to claim 7, wherein at least one of the second and the third liquid are water-based.

11. The method for producing a cholesteric liquid crystal based shell according to claim 7, wherein the stabilizer is selected from the group consisting of poly(vinyl alcohol), polyvinylpyrrolidone (PVP), polyacrylic acid (PAA), surfactant, or a combination thereof.

12. A cholesteric liquid crystal based solid shell comprising a perforation, the cholesteric liquid crystal based solid shell being produced according to a method comprising producing a cholesteric liquid crystal shell, solidifying the cholesteric liquid crystal shell so as to obtain a solid shell and perforating the solid shell.

13. The cholesteric liquid crystal based solid shell according to claim 12, wherein the solid shell has an uneven thickness, and wherein the perforation is located at the thinnest point of the shell.

14. The cholesteric liquid crystal based solid shell according to claim 12, wherein the solid shell is filled with an index-matching material.

15. The cholesteric liquid crystal based solid shell according to claim 12, wherein the solid shell comprises an inner surface and an outer surface, the orientation of the mesogenic moieties being modulated into a helix along an axis perpendicular to at least one of the inner surface and the outer surface of the shell.

16. The cholesteric liquid crystal based solid shell according to claim 12, wherein the diameter of the shell is comprised in the interval from 5 μm to 200 μm.

17. The cholesteric liquid crystal based solid shell according to claim 12, the solid shell having wavelength-selective reflections in the UV, IR or visible spectra.

18. A coating composition comprising a plurality of cholesteric liquid crystal based solid shells according to claim 12, the solid shells being immersed in an index-matching liquid material.

19. The method for producing a cholesteric liquid crystal based shell according to claim 4, wherein the solvent is selected from the group consisting of: acetone, ethanol, tetrahydrofuran (THF), dioxane, dimethylformamid (DMF), ethanone and a combination thereof.

20. The method for producing a cholesteric liquid crystal based shell according to claim 7, wherein removing the stabilizer from the inner surface and outer surface of the perforated solid shell is performed by rinsing out the stabilizer from the perforated solid shell.

* * * * *